US011091123B2

(12) United States Patent
Hong et al.

(10) Patent No.: US 11,091,123 B2
(45) Date of Patent: Aug. 17, 2021

(54) DEVICE FOR CONVERTING ROTATIONAL MOTION INTO RECIPROCATING ANGULAR MOTION AND WIPER SYSTEM INCLUDING THE SAME

(71) Applicant: DY AUTO Corporation, Asan-si (KR)

(72) Inventors: Sung Jin Hong, Asan-si (KR); Sung Ho Cho, Asan-si (KR)

(73) Assignee: DY AUTO Corporation, Asan-si (KR)

( * ) Notice: Subject to any disclaimer, the term of this patent is extended or adjusted under 35 U.S.C. 154(b) by 16 days.

(21) Appl. No.: 16/844,891

(22) Filed: Apr. 9, 2020

(65) Prior Publication Data
US 2020/0398790 A1    Dec. 24, 2020

(30) Foreign Application Priority Data

Jun. 20, 2019 (KR) .................. 10-2019-0073759

(51) Int. Cl.

| | |
|---|---|
| *B60S 1/08* | (2006.01) |
| *B60S 1/04* | (2006.01) |
| *B60S 1/38* | (2006.01) |
| *H02K 7/06* | (2006.01) |
| *B60S 1/44* | (2006.01) |
| *B60S 1/16* | (2006.01) |
| *B60S 1/58* | (2006.01) |

(Continued)

(52) U.S. Cl.
CPC ............... *B60S 1/08* (2013.01); *B60S 1/0441* (2013.01); *B60S 1/0848* (2013.01); *B60S 1/16* (2013.01); *B60S 1/163* (2013.01); *B60S 1/38* (2013.01); *B60S 1/44* (2013.01); *B60S 1/566* (2013.01); *B60S 1/583* (2013.01); *H02K 7/06* (2013.01); *H02K 33/02* (2013.01)

(58) Field of Classification Search
CPC .... B60S 1/44; B60S 1/185; B60S 1/18; B60S 1/166; B60S 1/16; B60S 1/163; B60S 1/30; B60S 1/566; B60S 1/583; B60S 1/0848; B60S 1/08; B60S 1/0441; A47L 1/02; A47L 1/03; A47L 1/05; H02K 7/06; H02K 33/02
USPC .... 15/250.12, 250.15, 250.22, 250.3, 250.31
See application file for complete search history.

(56) References Cited

U.S. PATENT DOCUMENTS 1,539,930 A * 6/1925 Berger ...................... B60S 1/06
                                                                    185/37
3,893,203 A * 7/1975 Berkelius .................. B60S 1/44
                                                                    15/250.22

(Continued)

FOREIGN PATENT DOCUMENTS

| JP | 2001055118 A | 2/2001 |
|---|---|---|
| KR | 20090045923 A | 5/2009 |

OTHER PUBLICATIONS

Machine translation of description portion of Japanese publication 2001055118, published Feb. 2001. (Year: 2001).*

(Continued)

*Primary Examiner* — Gary K. Graham
(74) *Attorney, Agent, or Firm* — Klarquist Sparkman, LLP

(57) ABSTRACT

A device for converting a rotational motion into a reciprocating angular motion and a wiper system including the same include a fixed body fixed to a certain object; a rotating body rotatably connected to the fixed body and rotating around a fixed axis; and a torsion spring coupled to the fixed axis and having an end portion and an opposite end portion, the end portion being held by the fixed body and the opposite end portion being held by the rotating body.

6 Claims, 6 Drawing Sheets

(51) Int. Cl.
    *B60S 1/56*     (2006.01)
    *H02K 33/02*    (2006.01)

(56) References Cited

U.S. PATENT DOCUMENTS 5,816,099 A * 10/1998 Turbessi .................. B60S 1/34
                                                    74/53
7,436,094 B2 * 10/2008 Zhao ........................ H02K 7/00
                                                   310/154.22

OTHER PUBLICATIONS

Notice of Allowance for Korean Application No. KR10-2019-0073759, dated Nov. 18, 2019 (w/English translation).
Office Action for Korean Application No. 10-2019-0073759, dated Oct. 20, 2019 (w/English translation).

* cited by examiner

DEVICE FOR CONVERTING ROTATIONAL MOTION INTO RECIPROCATING ANGULAR MOTION AND WIPER SYSTEM INCLUDING THE SAME

CROSS-REFERENCE TO RELATED APPLICATION

This application claims priority to Korean Patent Application No. 10-2019-0073759, filed on Jun. 20, 2019, in the Korean Intellectual Property Office, the disclosure of which is incorporated herein in its entirety by reference.

BACKGROUND

1. Field

One or more embodiments relate to a device for converting a rotational motion into a reciprocating angular motion, and more particularly, to a reciprocating motion device applicable to a wiper system and a wiper system including the same.

2. Description of the Related Art

In general, wiper systems of vehicles are configured to repeatedly perform a reciprocating motion by driving a link device, which is connected to the body of a vehicle via a wiper arm, using a motor, to remove dirt from a windshield or a rear window of the vehicle.

Wiper systems are very important as essential equipment for safe driving of vehicles.

An example of the configuration of such a wiper system is disclosed in KR Published Patent 2009-0045923.

Wiper systems remove dirt from the surface of vehicle glass via the reciprocating rotary motion of a wiper blade, thereby securing a driver's front or rear sight.

Wiper systems according to the related art, like the one disclosed in KR Published Patent 2009-0045923, are generally configured such that a motor rotates in one direction and a wiper arm, which is connected to a rotation shaft of the motor in a link structure, performs a reciprocating angular motion. The link structure is mechanically complex and includes many elements and thus incurs high manufacturing cost.

When the link structure is not used, the rotation shaft of a motor needs to perform a reciprocating angular motion, and therefore, a control circuit of the motor is added, increasing the price of the motor and resulting in high manufacturing cost.

Provided are a device for converting a rotational motion of a direct current (DC) motor into a reciprocating angular motion and an application of the device to a wiper system.

SUMMARY

Additional aspects will beset forth in part in the description which follows and, in part, will be apparent from the description, or may be learned by practice of the presented embodiments of the disclosure.

One or more embodiments include a device for converting a rotational motion into a reciprocating angular motion. The device includes a fixed body fixed to a certain object; a rotating body rotatably connected to the fixed body and rotating around a fixed axis; and a torsion spring coupled to the fixed axis and having an end portion and an opposite end portion, the end portion being held by the fixed body and the opposite end portion being held by the rotating body.

A pair of rotating wings may be symmetrically arranged with respect to a center of the rotating body and fixed to the rotating body;

the fixed body may include a pair of stoppers limiting a rotation range of the rotating body, the pair of stoppers being arranged in a certain angle range around the fixed axis; and the torsion spring may apply an elastic restoring force such that one of the pair of rotating wings is in contact with one of the pair of stoppers when an external force is not applied to the rotating body.

A wiper system characterized by coupling a wiper blade to the rotating body may be configured.

The wiper blade may be mounted on each of the pair of rotating wings.

The wiper system may include a direct current motor rotating the rotating body.

The direct current motor may be controlled to be powered off after the direct current motor rotates the rotating body in one direction by an angle between the pair of stoppers.

The fixed body may have an open structure in a range in which the pair of rotating wings rotate.

The direct current motor may be adhesively fixed to a surface of vehicle glass.

The first magnet wheel may be provided at an end of an output shaft of the direct current motor not to penetrate the vehicle glass and may include a permanent magnet.

The fixed body may be adhesively fixed to an opposite surface of the vehicle glass.

The rotating body may be between the vehicle glass and the fixed body.

The rotating body may include a second magnet wheel configured to produce an attractive force with respect to the first magnet wheel.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
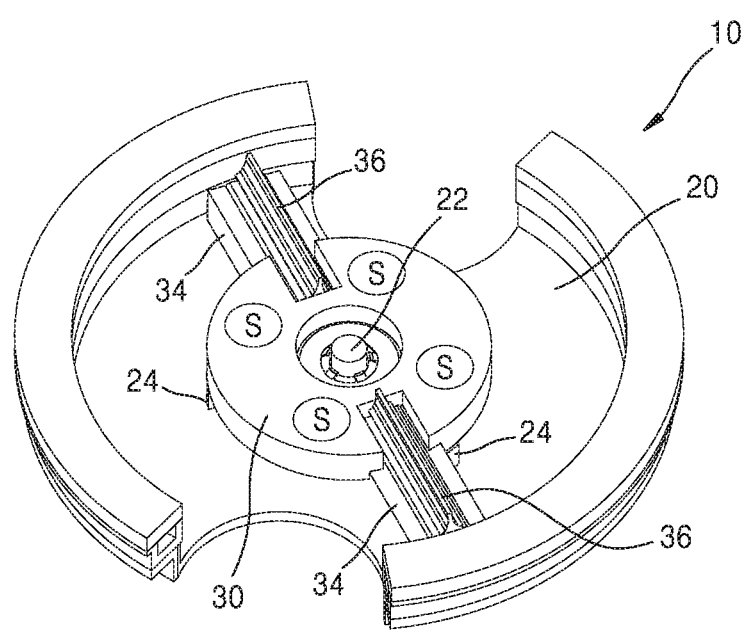
FIG. 1 is a perspective view of a device for converting a rotational motion into a reciprocating angular motion, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
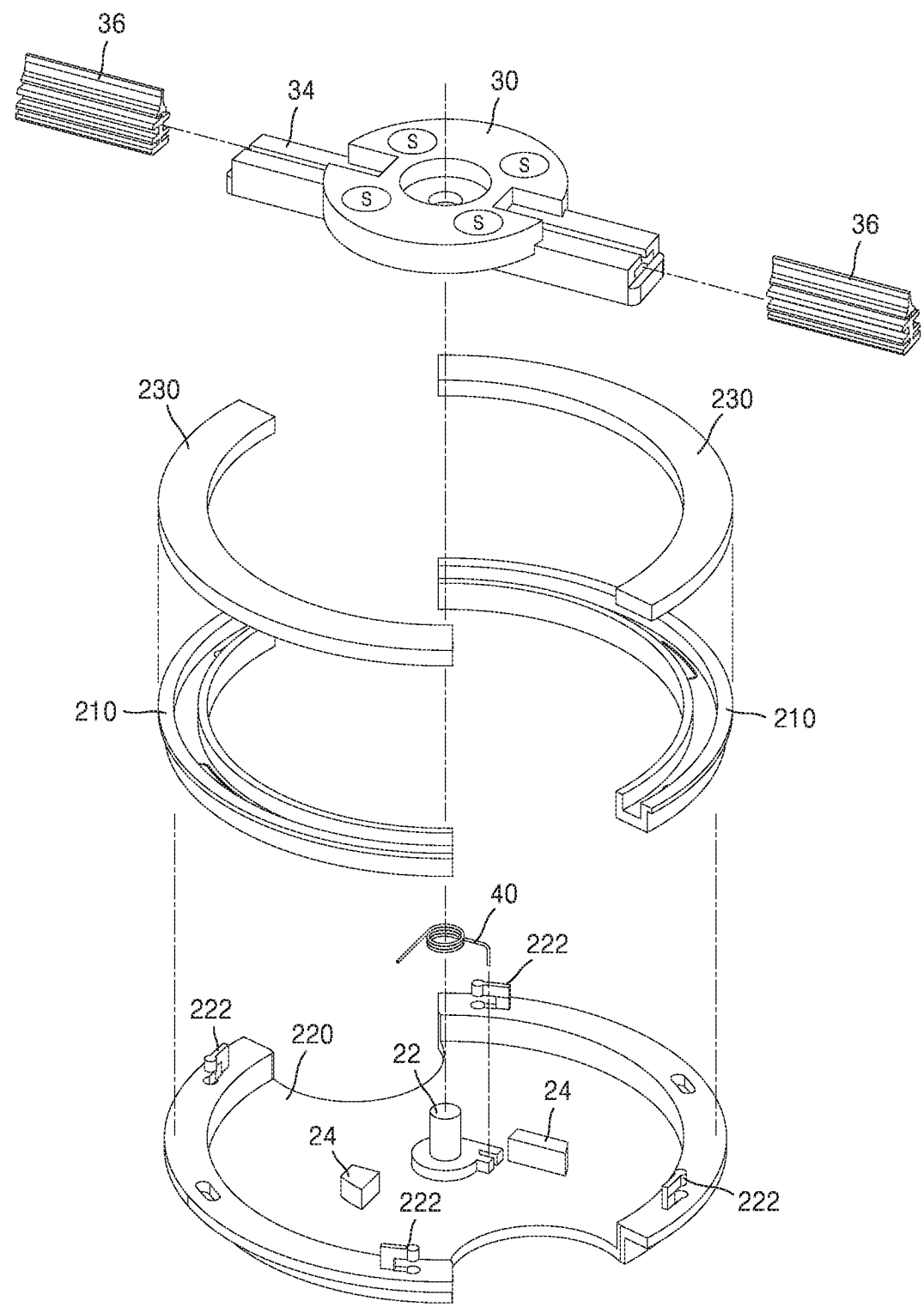
FIG. 2 is an exploded perspective view of the device of FIG. 1.
Figure 3:
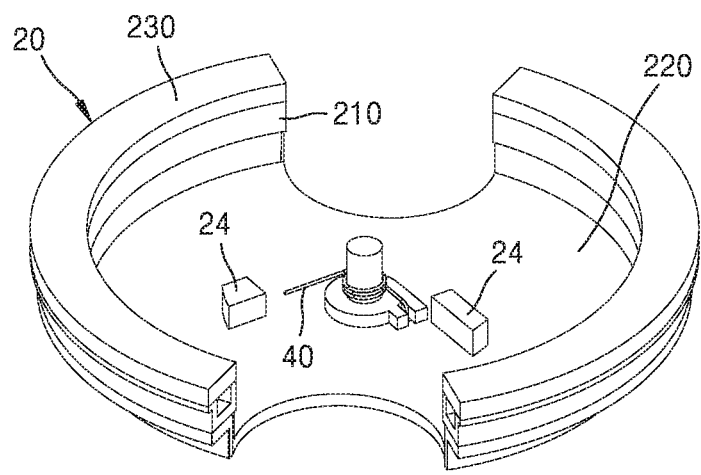
FIG. 3 is a diagram illustrating a combined structure of a fixing body and a torsion spring in the device of FIG. 1.
Figure 4:
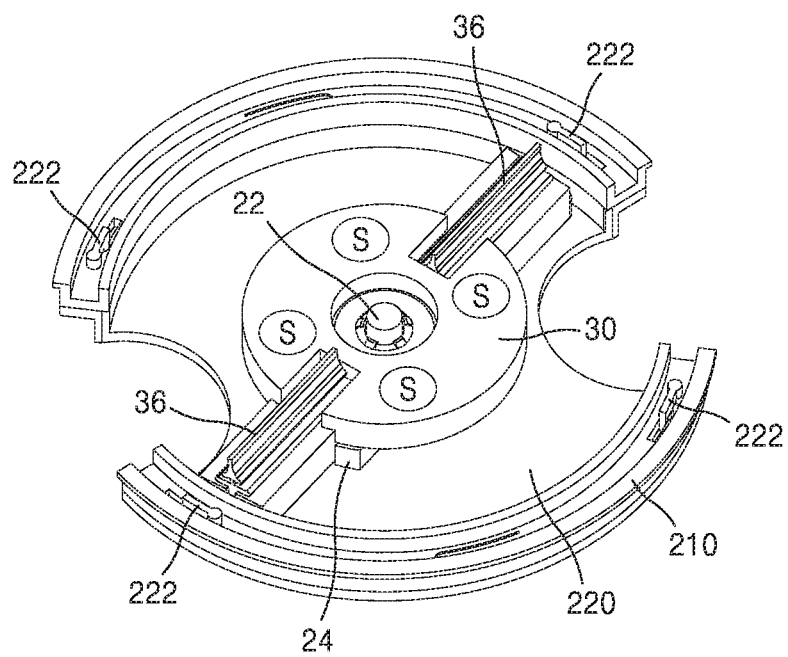
FIG. 4 is a diagram illustrating the detailed structure of the fixing body in FIG. 1.
Figure 5:
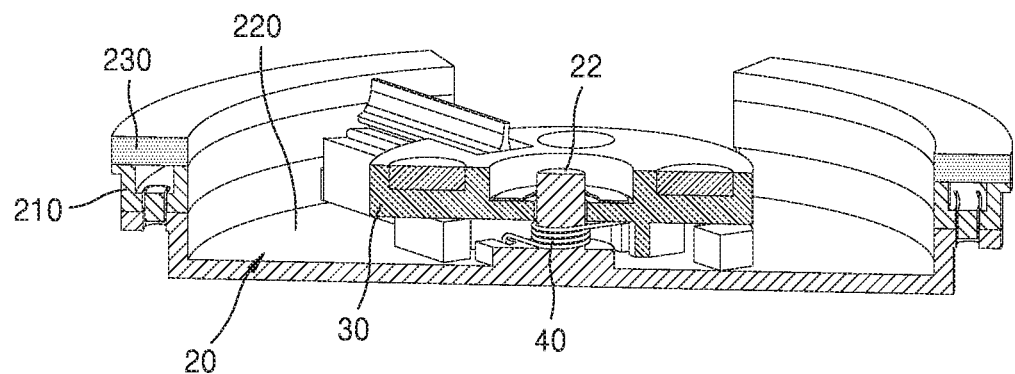
FIG. 5 is a partial cross-sectional view illustrating a structure in which a torsion spring is supported by a fixing body and a rotating body.
Figure 6:
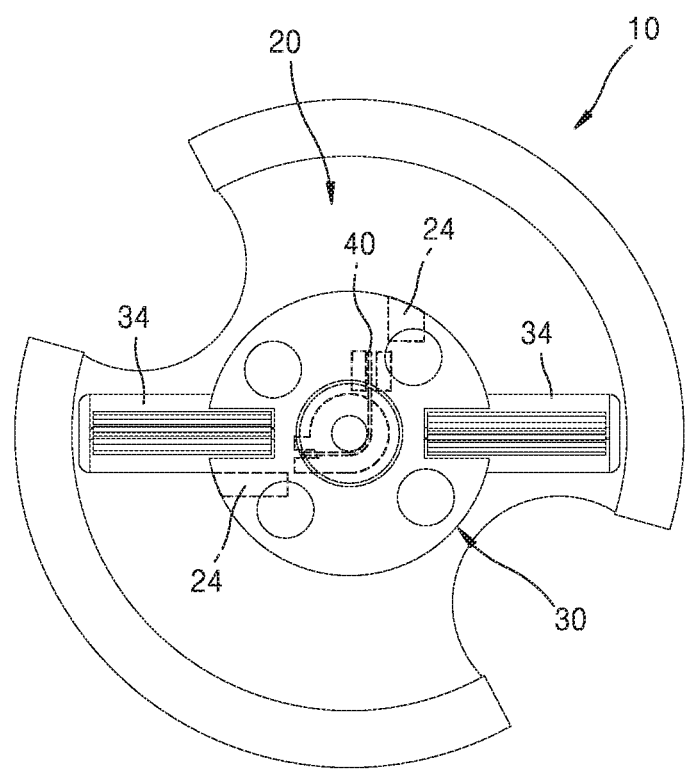
FIG. 6 is a diagram illustrating an initial state of the device of FIG. 1.
Figure 7:
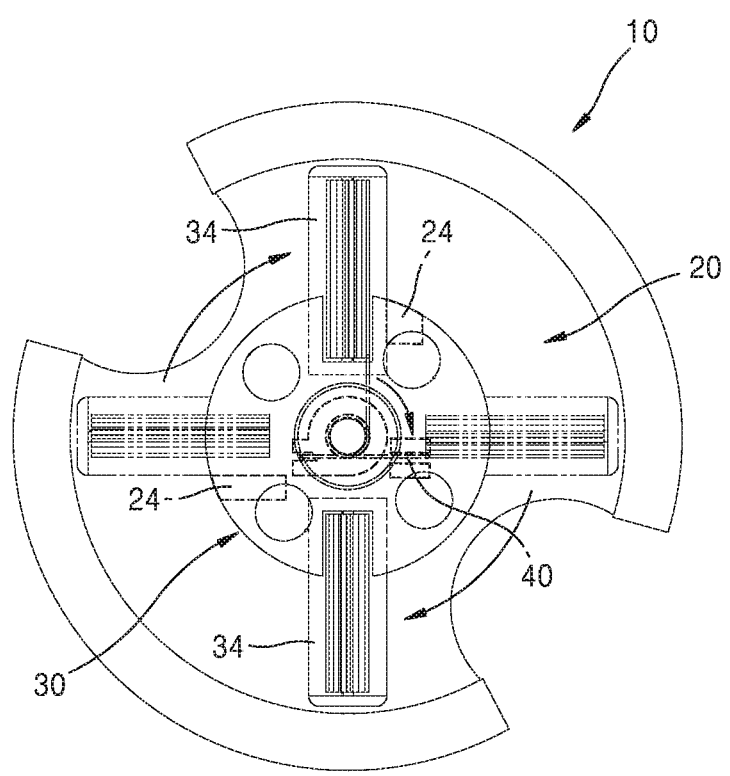
FIG. 7 is a diagram illustrating a state in which a rotating body has rotated to a reverse position in the device of FIG. 1.

FIG. 1 is a perspective view of a device for converting a rotational motion into a reciprocating angular motion, according to an embodiment. FIG. 2 is an exploded perspective view of the device of FIG. 1. FIG. 3 is a diagram illustrating a combined structure of a fixing body and a torsion spring in the device of FIG. 1. FIG. 4 is a diagram illustrating the detailed structure of the fixing body in FIG. 1. FIG. 5 is a partial cross-sectional view illustrating a structure in which a torsion spring is supported by a fixing body and a rotating body. FIG. 6 is a diagram illustrating an initial state of the device of FIG. 1.

Referring to FIGS. 1 through 7, a device 10 for converting a rotational motion into a reciprocating angular motion includes a fixed body 20, a rotating body 30, and a torsion spring 40.

The fixed body 20 is a member to be fixed to a particular object. For example, the fixed body 20 may be fixed to an outer surface of vehicle glass. The fixed body 20 may be fixed to the vehicle glass by, for example, an adhesive. The fixed body 20 may be formed by combining a plurality of components. For example, the fixed body 20 may include a fixed base 210 and a connection cover 220. The fixed base 210 may be fixed to a vehicle glass 300 by an adhesive or an adhesive tape 230. The connection cover 220 may be removably fixed to the fixed base 210. The connection cover 220 may have a fixing hook 222 and may be fixed to the fixed base 210 when the fixing hook 222 is caught in a slot formed in the fixed base 210. The fixing hook 222 may have a structure in which the fixing hook 222 is inserted into a slot or a hole formed in the fixed base 210 and then rotated, thereby being prevented from escaping.

The rotating body 30 is rotatably coupled to the fixed body 20. For example, the rotating body 30 may be coupled to the fixed body 20 such that the rotating body 30 is rotatable around a fixed axis 22 of the fixed body 20.

The torsion spring 40 may include a coil-type spring. The torsion spring 40 is coupled to the fixed axis 22. An end portion of the torsion spring 40 is held by the fixed body 20. An opposite end portion of the torsion spring 40 is held by the rotating body 30. The torsion spring 40 has an elastic restoring force increasing with the rotation of the rotating body 30. Accordingly, when an external force applied to the rotating body 30 is removed, the rotating body 30 is rotated in an opposite direction to the external force by the elastic restoring force of the torsion spring 40. As described above, the rotating body 30 may perform a reciprocating angular motion due to the elastic restoring force of the torsion spring 40.

A rotating wing 34 may be provided in the rotating body 30. A pair of rotating wings 34 may be provided. The pair of rotating wings 34 may be symmetrically arranged with respect to the center of the rotating body 30. The rotating wings 34 are fixed to the rotating body 30. The rotating wings 34 may be coupled to the rotating body 30 by forced pressure fitting.

The fixed body 20 includes a pair of stoppers 24. The stoppers 24 limit the rotation range of the rotating body 30 to a certain angle range around the fixed axis 22. Accordingly, the stoppers 24 are separated from each other by a certain angle around the fixed axis 22. The end portion of the torsion spring 40 may be held by one of the stoppers 24. The torsion spring 40 is provided to apply an elastic restoring force such that one of the rotating wings 34 is in contact with one of the stoppers 24 when an external force is not applied to the rotating body 30.

A wiper system 100 may be configured, including the device 10 for converting a rotational motion into a reciprocating angular motion, which has been described above.

The wiper system 100 includes a wiper blade 36 coupled to the rotating body 30. In detail, the wiper blade 36 is mounted on each of the rotating wings 34.

The rotating body 30 is rotated by a direct current (DC) motor 110. An output shaft 112 of the DC motor 110 may be configured to directly transmit power to the rotating body 30 or to, as described below, indirectly transmit torque to the rotating body 30 using a magnetic force.

The DC motor 110 is controlled to be powered off after the DC motor 110 rotates the rotating body 30 in one direction for a certain time period. In detail, the DC motor 110 is controlled to be powered off after the DC motor 110 rotates the rotating body 30 a little further than an angle between the stoppers 24. In this case, the DC motor 110 is substantially powered off after rotating the rotating body 30 in one diction by the angle between the stoppers 24. When the DC motor 110 is controlled to rotate for only a certain time period as described above, a control algorithm is simple, thereby preventing malfunction and reducing manufacturing cost. When power of the DC motor 110 is cut off, the rotating body 30 is restored to an original state by the elastic restoring force of the torsion spring 40.

The fixed body 20 has an open structure in a range in which the rotating wings 34 rotate. In detail, the fixed body 20 has an open structure in a range of the reciprocating rotary motion of the wiper blade 36 rotating together with each of the rotating wings 34. The open structure is formed in the fixed body 20 to secure a sight in a range wiped by the wiper blade 38. The fixed body 20 may have open sections separated from each other by 180□.

Hereinafter, the schematic configuration of the wiper system 100, in which power is indirectly transmitted from the DC motor 110 to the device 10 for converting a rotational motion into a reciprocating angular motion via a magnetic force, will be described.

Figure 8:
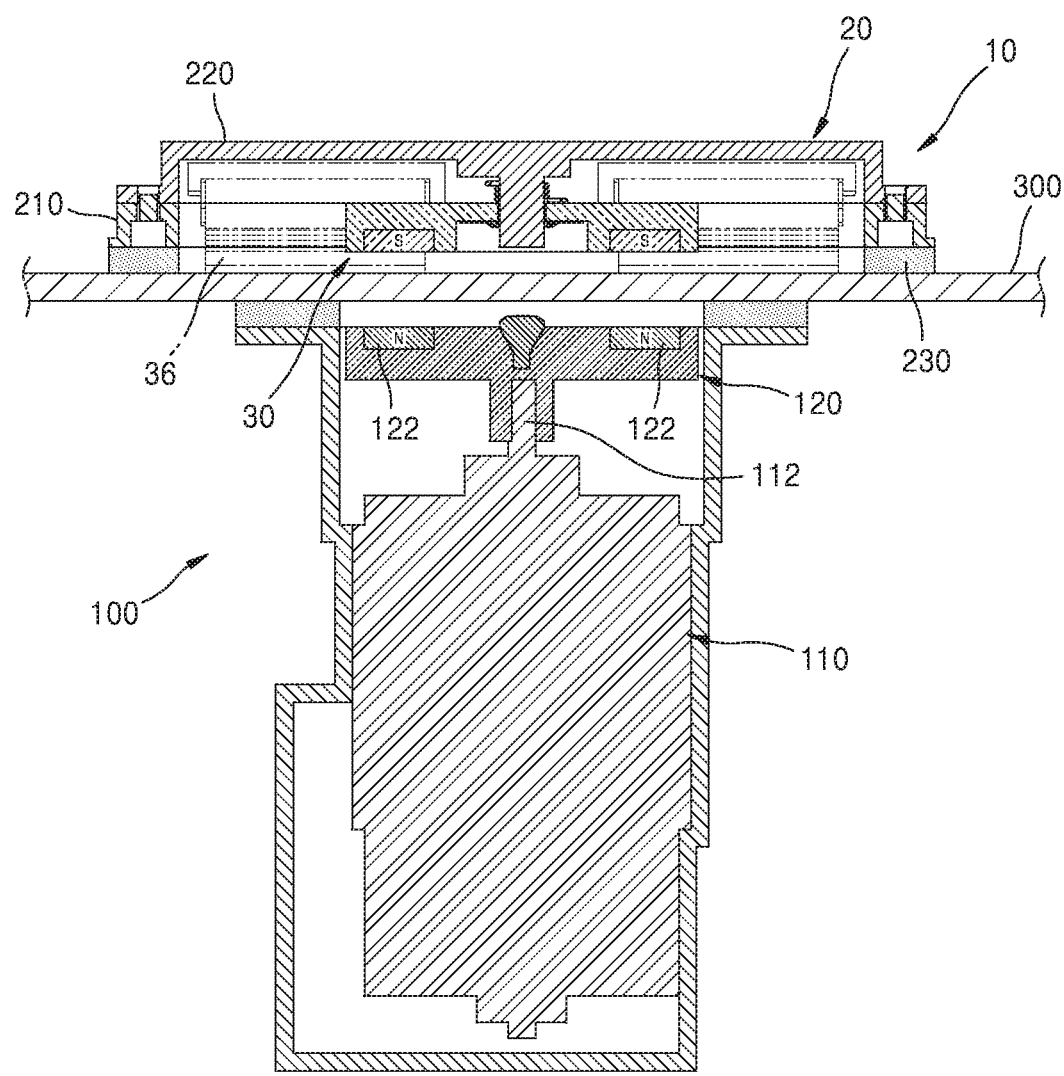
FIG. 8 is a conceptual cross-sectional view illustrating a state in which a wiper system including the device of FIG. 1 is mounted on a vehicle.

Referring to FIG. 8, the DC motor 110 is adhesively fixed to a surface of the vehicle glass 300 in the wiper system 100. In detail, the DC motor 110 is adhesively fixed to an interior surface of the vehicle glass 300.

A first magnet wheel 120 is provided at an end of the output shaft 112 of the DC motor 110. The first magnet wheel 120 is provided not to penetrate the vehicle glass 300. The first magnet wheel 120 includes a permanent magnet 122. A plurality of permanent magnets 122 may be arranged around the output shaft 112 of the DC motor 110 to be separated from each other by, for example, 90□.

The fixed body 20 is adhesively fixed to an opposite surface of the vehicle glass 300. In detail, the fixed body 20 is adhesively fixed to an exterior surface of the vehicle glass 300.

The rotating body 30 is between the vehicle glass 300 and the fixed body 20. The rotating body 30 is rotatably mounted on the fixed body 20. The rotating body 30 may include a second magnet wheel configured to produce an attractive force with respect to the first magnet wheel 120. The second magnet wheel is arranged such that an attractive force acts between the first magnet wheel 120 and the second magnet wheel. The second magnet wheel may be substantially the same element as the rotating body 30. The rotating body 30 is provided not to be in direct contact with the vehicle glass 300.

The wiper system 100 configured as described above may be applied to rear glass of a vehicle. For example, the wiper system 100 may be provided to remove dirt from the surface of glass, in which a camera lens of an autonomous vehicle is provided.

Hereinafter, the effects of embodiments will be described in detail with an example of a process of removing dirt from the vehicle glass 300 using the wiper system 100.

It is assumed that the wiper system 100 is mounted on a vehicle, as shown in FIG. 8. When the DC motor 110 is not powered, the torsion spring 40 is maintained in a state in which one of the rotating wings 34 is in contact with one of the stoppers 24. This state is defined as an initial state. The DC motor 110 is driven. Accordingly, the first magnet wheel 120 rotates. The second magnet wheel, i.e., the rotating body 30, which is arranged to produce an attractive force with respect to the first magnet wheel 120, rotates together with the first magnet wheel 120. With the rotation of the rotating body 30, the wiper blade 36 removes dirt from a surface of the vehicle glass 300.

The rotating wing 34 rotates from the initial state to a state in which the rotating wing 34 is in contact with the other of the stoppers 24. This state is defined as a reversion position. When the rotating wing 34 reaches the reversion position, power supply to the DC motor 110 is cut off. Accordingly, a driving force is not transmitted to the first magnet wheel 120. Simultaneously, the rotating body 30 is rotated back to the initial state by the elastic restoring force of the torsion spring 40. Accordingly, the wiper blade 36 also rotates in the rotation direction of the rotating body 30. Consequently, the wiper blade 36 performs a reciprocating rotary motion. While the rotating body 30 is returning from the reversion position to the initial state, the rotating body 30 rotates the first magnet wheel 120. Accordingly, the rotation shaft of the DC motor 110 rotates in a reverse direction. When the rotating body 30 returns to the initial position, power is supplied to the DC motor 110 and the rotating body 30 rotates to the reversion position. When such operation is repeated, the wiper blade 36 may smoothly remove dirt from the vehicle glass 300. In the embodiment described above, a plurality of rotating wings 34 are provided, but only one rotating wing 34 may be provided. The wiper blade 36 may be arranged to protrude outwards from the fixed body 20.

As described above, according to embodiments, a device for converting a rotational motion into a reciprocating angular motion is rotated from an initial state to a reversion position by an external force during the reciprocating angular motion but is driven by the elastic restoring force of a torsion spring without the external force when returning from the reversion position to the initial state so that the reciprocating angular motion may be performed by only intermittent rotation of a simple DC motor. Therefore, when the device is applied to a wiper system of a vehicle, the manufacturing cost of the wiper system may be significantly reduced because the structure of the device is very simple compared to a link structure. In addition, when a first magnet wheel is provided in a DC motor rotating a rotating body and the rotating body is configured as a second magnet wheel producing an attractive force with respect to the first magnet wheel, a hole is not formed in vehicle glass, and accordingly, the risk of an inflow of moisture or corrosion of a motor may be significantly reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A device for converting a rotational motion into a reciprocating angular motion, the device comprising:
   a fixed body fixed to a certain object;
   a rotating body rotatably connected to the fixed body and rotating around a fixed axis; and
   a torsion spring coupled to the fixed axis and having an end portion and an opposite end portion, the end portion being held by the fixed body and the opposite end portion being held by the rotating body,
   wherein a pair of rotating wings are symmetrically arranged with respect to a center of the rotating body and fixed to the rotating body;
   the fixed body includes a pair of stoppers limiting a rotation range of the rotating body, the pair of stoppers being arranged in a certain angle range around the fixed axis; and
   the torsion spring applies an elastic restoring force such that one of the pair of rotating wings is in contact with one of the pair of stoppers when an external force is not applied to the rotating body.

2. A wiper system including the device of claim 1, the wiper system comprising a wiper blade coupled to the rotating body.

3. The wiper system of claim 2, wherein the wiper blade is mounted on each of the pair of rotating wings.

4. The wiper system of claim 3, further comprising a direct current motor rotating the rotating body,
   wherein the direct current motor is controlled to be powered off after the direct current motor rotates the rotating body in one direction by an angle between the pair of stoppers.

5. The wiper system of claim 4, wherein the direct current motor is adhesively fixed to a surface of vehicle glass;
   a first magnet wheel is provided at an end of an output shaft of the direct current motor not to penetrate the vehicle glass and includes a permanent magnet;
   the fixed body is adhesively fixed to an opposite surface of the vehicle glass;
   the rotating body is between the vehicle glass and the fixed body; and
   the rotating body includes a second magnet wheel configured to produce an attractive force with respect to the first magnet wheel.

6. The wiper system of claim 3, wherein the fixed body has an open structure in a range in which the pair of rotating wings rotate.

* * * * *